United States Patent [19]
Christensen et al.

[11] Patent Number: 5,680,397
[45] Date of Patent: Oct. 21, 1997

[54] MULTI-PORT LAN SWITCH FOR A TOKEN-RING NETWORK

[75] Inventors: Kenneth J. Christensen, Apex; Francis E. Noel, Durham; Rudolf E. Rehquate, Raleigh; Thomas Stammely, Cary; Jerry Dagher, Raleigh; Beymer Bevill, Jr., Fuquay-Varina, all of N.C.

[73] Assignee: International Business Machines Corporation, Armonk, N.Y.

[21] Appl. No.: 402,740

[22] Filed: Mar. 13, 1995

[51] Int. Cl.⁶ .......................... H04L 12/16; H04L 12/44
[52] U.S. Cl. ........................ 370/421; 370/434; 370/425
[58] Field of Search ................................ 370/225, 228, 370/275, 278, 258, 254, 294, 296, 323, 257, 421, 537, 540, 434, 420, 425, 424, 222, 452; 340/825.05; 395/200.21

[56] References Cited

U.S. PATENT DOCUMENTS

| | | | |
|---|---|---|---|
| 3,410,968 | 11/1968 | Hochreutiner | 370/5 |
| 4,024,360 | 5/1977 | Biraghi et al. | 370/5 |
| 4,130,736 | 12/1978 | De Marco et al. | 370/225 |
| 4,173,714 | 11/1979 | Bloch et al. | 370/5 |
| 4,191,941 | 3/1980 | Springer et al. | |
| 4,423,507 | 12/1983 | Roger et al. | 370/85.5 |
| 4,583,214 | 4/1986 | Miyashita et al. | 370/5 |
| 4,905,230 | 2/1990 | Madge et al. | |
| 4,935,926 | 6/1990 | Herman | |
| 5,132,832 | 7/1992 | Matz et al. | |
| 5,199,026 | 3/1993 | Lund | |
| 5,231,628 | 7/1993 | Boman | |
| 5,282,237 | 1/1994 | Babu et al. | |
| 5,303,387 | 4/1994 | Millard et al. | |
| 5,311,515 | 5/1994 | Henderson et al. | |
| 5,351,242 | 9/1994 | Kramarczyk et al. | 370/85.5 |

FOREIGN PATENT DOCUMENTS

| | | |
|---|---|---|
| 0166193 | 1/1986 | European Pat. Off. . |
| 0289189 | 11/1988 | European Pat. Off. . |
| 9009712 | 8/1990 | WIPO . |
| 9321704 | 10/1993 | WIPO . |

OTHER PUBLICATIONS

IBM Technical Disclosure Bulletin, vol. 37, No. 40A, Apr. 1994.
"Token-Ring 16/4 Adapter with Full-Duplex Switching Operation Mode" XP 2008692.

*Primary Examiner*—Chau Nguyen
*Attorney, Agent, or Firm*—Joscelyn G. Cockburn

[57] ABSTRACT

A multi-port LAN switch is provided that enables attached network devices to both communicate directly and to insert into a token-ring network through an attached concentrator. Each port of the multi-port LAN switch has a first transformer, a second transformer, and a switching system. The first transformer has a first winding connected to a first connection of the port. The second transformer has a first winding connected to a second connection of the port. The switching system switches to a port mode or an adapter mode as a function of a mode signal transmitted to the port. In the adapter mode, the switching system connects a second winding of the first transformer to a transmitter circuit in the port, and its connects a second winding of the second transformer to a receiver circuit in the port. In the port mode, the switching system connects the second winding of the first transformer to the receiver circuit in the port, and it connects the second winding of the second transformer to the transmitter circuit in the port. Each port of the multi-port LAN switch further includes a DC voltage source that is switchably connected to the first connection of the port through a first switch. Each port further includes a second switch that connects the second connection of the port to a DC return-path in a first position, and connects the second connection to the first connection when in a second position.

19 Claims, 8 Drawing Sheets

MULTI-PORT LAN SWITCH FOR A TOKEN-RING NETWORK

BACKGROUND OF THE INVENTION

1. Technical Field

The present invention relates in general to an improved data communications networking system, and in particular to an improved local area network (LAN) switch. Still more particularly, the present invention relates to a multi-port LAN switch for providing a communications link between a network adapter and a network concentrator, a network adapter and another network adapter or a network concentrator and another network concentrator.

2. Description of the Related Art

In digital data transmission systems, composite clock and data signals in binary form are transmitted over media such as wires or fiber optic cables from a transmission line transmitter to a transmission line receiver. The transmitter and the receiver in a data communications system may each be a single computer or may each comprise a local area network (LAN) of computers. An individual computer or station in a LAN may both send information to other stations in the LAN and receive information from other stations. The station inserts into the LAN when it desires to communicate with another station in the LAN, and detaches from the LAN when the communications are complete.

A common LAN topology is the "token-ring" network. The token-ring is used to interconnect the devices attached to the network. The token-ring network allows unidirectional data transmission between stations in a ring-like circuit by a token passing procedure. The ring topology permits tokens to be passed from a node associated with a particular attached device, such as a personal computer, to another node in the ring. A node that is ready to send data can capture the token and thereafter insert data for transmission. If information received by a node or station is destined for a station further along the network, the receiving station must pass the information along the LAN to the next adjacent station, and so forth, until the information reaches its final destination. A device or computer station attempting to gain access to a node of the token-ring will have an adapter, which is physically connected to the token-ring. This accessing device must carry out a procedure following a standard protocol in order to access the token-ring.

One type of token-ring product has two data transmission speeds, 4 Mbps and 16 Mbps. Both of the transfer speeds are frequently used, and often, the data transmission speed of 4 Mbps may be used in one network, while the data transmission speed of 16 Mbps may be used in another network, both of which a user may wish to access.

Many LANs employ concentrators, or hubs, also known as multi-station access units, to connect many stations at a single network node. These multistation access units connect individually with each station along a 4-wire cable called a lobe. Multiple lobes extend out from a concentrator to individual stations to form a star-like structure. Physically, each station is individually attached to the concentrator through its lobe where it may access the network node. All stations attached to a particular concentrator operate at the same network speed (e.g., 4-Mbps). When the concentrator is connected to a token-ring network, the logical configuration of the network places each station connected to the concentrator at a separate node within the ring. A concentrator can individually connect the attached devices in a token-ring, or it may be connected with other concentrators to form a larger token-ring comprised of all the devices attached to all concentrators. An intelligent concentrator is one that includes processor controlled switching electronics for controlling access to the network.

A concentrator is usually referred to as a "Multi-Station Access Unit" or MAU. Such system is provided for in the IEEE 802.5 specification, which refers to such system as a "Trunk Coupling Unit." Single lobes comprised of two twisted-pair wires connect a network adapter or other communication device to a port of the concentrator. Single lobes are combined with other identical lobes to form a complete concentrator. While the number of lobes in a concentrator can vary, the most popular configuration utilizes eight lobes and such is due primarily to the physical size of the token-ring connector as it fits in a standard equipment rack.

The function of a MAU is to electrically insert and remove a workstation or personal computer from a communication networking system, or more specifically, to connect or remove a workstation or personal computer from a token-ring network. Control of the insertion or removal of a workstation from a token-ring network is accomplished, as specified in the IEEE standards, by means of a DC voltage that is sometimes referred to as a "phantom drive current." This phantom drive is applied between the two pairs of conductors in the data cable or lobe that connects the workstation to the Multi-Station Access Unit. When the phantom drive current (or voltage) is present at a preselected level or potential, the MAU functions to insert the workstation into the network. When the phantom drive is absent or falls below a preselected level, the workstation is removed from the network. For a more detailed reference to information relating to the operation of a MAU, reference may be made to IEEE 802.5. In addition, a full-duplex (FDX) adapter can gain access to the network by sending an FDX registration frame to a port on a LAN switch. The FDX frame is a special frame identifying an adapter or switch port as having FDX capability. If an adapter or switch port receives this frame, it responds by transmitting its own FDX registration frame. After this FDX frame handshaking occurs, the phantom drive is asserted. This method of insertion is described in U.S. patent application Ser. No.08/ 399,267, filed Mar. 6, 1995, entitled "Apparatus and Method for Determining Operational Mode for a Station Entering a Network.", Chorpenning, J., et. al. now U.S. Pat. No. 5,561,666, incorporated herein by reference.

Each computer attached to the network is connected to a respective lobe port of the concentrator via a cable, and the computer exercises control of the insertion/bypass mechanism via the cable using the phantom drive. This DC voltage is transparent to the passage of computer-transmitted data, hence the name "phantom". The impressed voltage is used within the lobe port of the concentrator to affect the serial insertion of the computer in the ring. Cessation of the phantom drive causes a de-insertion action that will bypass the computer and cause the computer to be put in a looped (wrapped) state.

A computer attached to the network contains a network adapter card having the electronics and hardware necessary to both connect with a MAU via a lobe and to insert and communicate in a token-ring network. In existing token-ring adapters, convention requires that data be transmitted on the orange/black pair of wires and received on the red/green pair of wires in the medium interface cable. Token-ring adapters connect directly to a MAU, such as the IBM® 8228, so that the MAU receives data on the orange/black pair of wires and transmits on the red/green pair of wires. The phantom drive current is asserted by the token-ring adapter on the orange/ black pair of wires to allow insertion into the token-ring. The phantom drive current provides a dual function of both detecting faulty wiring and engaging the relay in the MAU to serially connect the computer into the token-ring. Thus, by convention, adapters source phantom drive and a MAU sinks phantom drive.

While the above described token-ring network allows every network adapter to communicate with every other network adapter, this communication must be performed over the token-ring network through a concentrator. Consequently, two computers situated adjacent to each other within the LAN must communicate using the network's limited bandwidth, which is shared with every adapter attached to the network. There are two problems that prevent direct connection of two network adapters. First, the direct connection of two network adapters meeting the standard set forth in IEEE 802.5 would have their transmit twisted-pair (orange/black pair) directly connected, and their receive wires (red/green twisted-pair) directly connected, preventing any communication between the two network adapters. Second, currently available network adapters cannot sink phantom drive; they only source phantom drive. Without the capability to sink phantom drive, an adapter attempting to communicate would source phantom drive to the receiving adapter, which could not sink the phantom drive. Thus, the sourcing adapter would detect a "wire fault" condition. Upon detecting a wire fault condition, the adapter would automatically stop transmitting data.

SUMMARY OF THE INVENTION

It is therefore an object of the present invention to provide an apparatus that "crosses-over" the transmit and receive wires of network adapters attached to the apparatus to allow direct communication between the adapters. It is a further object of the present invention to provide a phantom drive sink capability to prevent an erroneous "wire fault" condition from being detected when two network devices are in direct communication. It is a still further object of the present invention to provide a direct communication link between two network devices that provides the full network bandwidth (for example, 16 Mbps), rather than the shared bandwidth provided by a connection through the token-ring network.

According to the present invention, a multi-port LAN switch is provided that enables attached network adapters to both communicate directly and to insert into a token-ring network through an attached concentrator. Each port of the multi-port LAN switch has a first transformer, a second transformer, and a switching system. The first transformer has a first winding connected to a first connection of the port. The second transformer has a first winding connected to a second connection of the port. The switching system switches to a port mode or an adapter mode as a function of a mode signal. In the adapter mode, the switching system connects a second winding of the first transformer to a transmitter circuit in the port, and it connects a second winding of the second transformer to a receiver circuit in the port. In the port mode, the switching system connects the second winding of the first transformer to the receiver circuit in the port, and it connects the second winding of the second transformer to the transmitter circuit in the port.

According to another feature of the present invention, each port of the multi-port LAN switch further includes a DC voltage source that is switchably connected to the first connection of the port through a first switch. Each port further includes a second switch that connects the second connection of the port to a DC return-path in a first position, and connects the second connection to the first connection in a second position.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
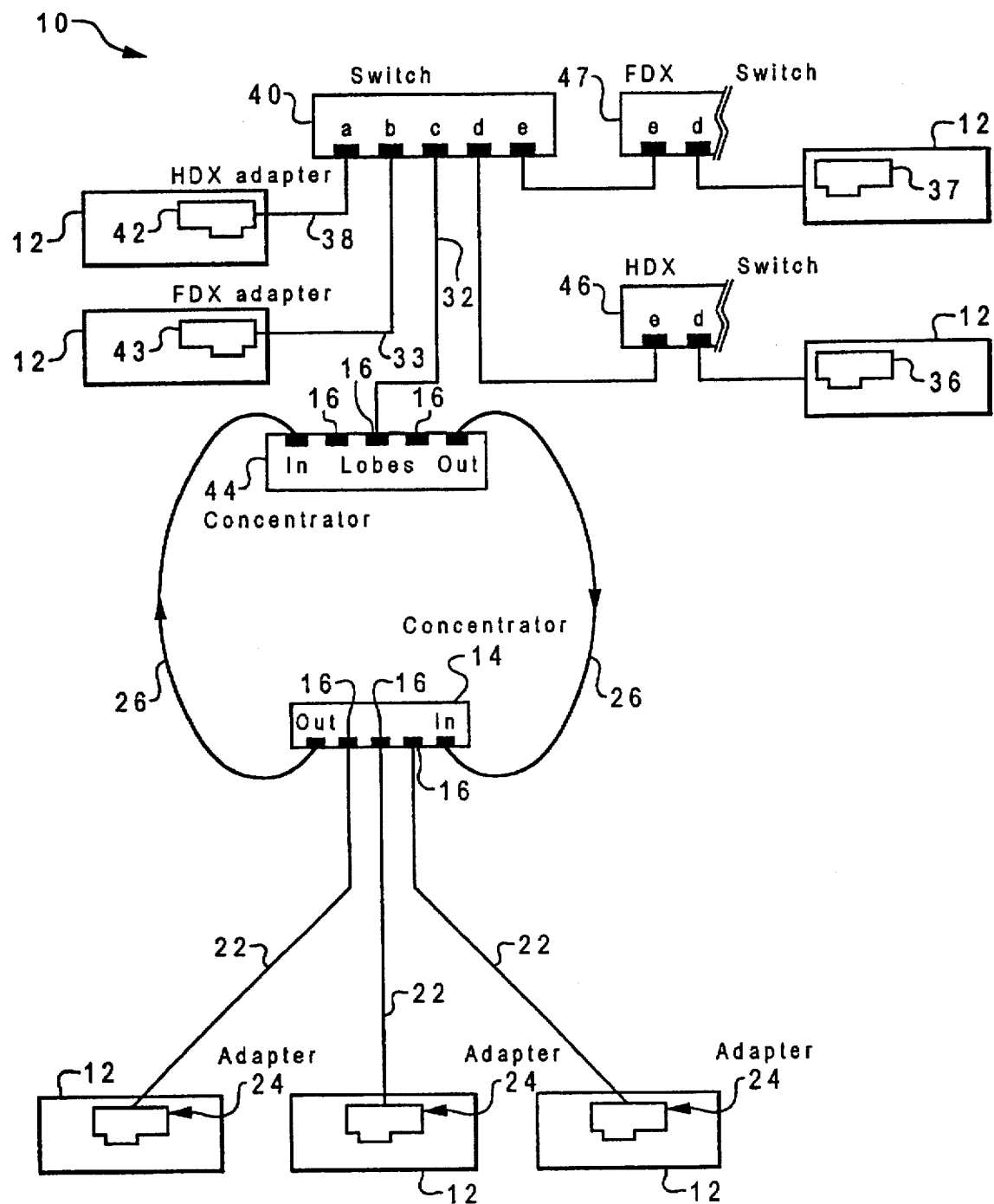
FIG. 1 shows a data communication and networking system according to a preferred embodiment of the present invention.

With reference now to the figures and in particular with reference to FIG. 1, there is depicted a high-level block diagram of a communications networking system, which includes a multi-port LAN switch in accordance with the present invention. FIG. 1 shows a digital data communication networking system 10 into which is incorporated the multi-port LAN switches (40, 46, 47) of the present invention. The system 10 comprises a local area network (LAN), which is formed by a plurality of attached devices or stations 12, such as personal computers or workstations. The stations 12 are connected to each other by concentrators 14 and 44 and by LAN switches 40, 46, 47. A typical concentrator can receive up to 8 attached devices, and can complete the network connection between the attached devices standing alone. A concentrator may also be attached to a main network connecting multiple concentrators to form a larger network over a greater geographic area.

Each station 12 is connected to concentrators 14, 44, such as the IBM® 8228 MAU, at an attachment port 16 by a lobe, such as lobe 22, which is a transmission media. The particular attached device or station 12 is inserted into the network by means of a network adapter (24, 36, 37, 42, 43) contained in the station 12. The adapter provides the direct connection to the lobe and the mechanism by which each of the stations gain access to the network to send and receive data, and it contains the hardware and/or software necessary to physically connect with and operate within the network.

Concentrators 14, 44 complete the physical connection between ports 16, so that an attached device 12 may communicate to other attached devices 12. Concentrators 14, 44 are intelligent concentrators having control logic and relay mechanisms to control the connection of the different stations 12, the operation of which is well known to those skilled in the art.

The main ring 26 connects the concentrator 14 with multiple concentrators, such as the concentrator 44, that are serially connected along the ring network. The main ring may comprise a fiber optic cable or other type of known data transmission media, such as a shielded or unshielded twisted pair of copper wires. Each concentrator is connected to the main ring 26 through a Ring-In/Ring-Out (RI/RO) device contained in the concentrator. The IN/OUT ports on the concentrators 14, 44 connect together through main ring 26 to form a transmission circuit "ring", such that data travels in a clockwise direction around the ring network. This enables stations inserted at a port 16 to communicate with not only the other stations 12 attached to concentrator 14, but also other stations and servers on the network that are attached to a different concentrator, such as concentrator 44.

In the preferred embodiment, a token ring topology is used to interconnect the attached devices or stations 12 within the LAN. The token ring network allows unidirectional data transmission between stations in a ring-like circuit by a token passing procedure. The ring topology permits tokens to be passed from a particular station 12 to another station 12 attached to concentrator 14, or to another station 12 attached to concentrator 44. A station 12 that is ready to send data can capture the token and thereafter insert data for transmission over the network.

The preferred token ring network is an IEEE 802.5 token-ring network, and particularly the IBM® Token-Ring network, which permits high-bandwidth peer-to-peer connectivity for the individual stations. The IBM® Token-Ring network may operate at a data rate of either 4 Mb/sec or 16 Mb/sec, and supports as many as 260 stations per ring. The IBM® Token-Ring network utilizes a differential Manchester code, which is a digital encoding technique, wherein each bit period is divided into two complementary halves to encode base band digital waveforms. A transition at the beginning of the bit period represents one of the binary digit "0", while the absence of a transition at the beginning of a bit period represents a binary digit "1". It is intended, and it will be appreciated by those skilled in the art, that the present invention is not limited in application to the preferred embodiment of a token ring network, and that it may be utilized within any digital data transmission or networking system.

An attached station or device 12 attempting to gain access to the network has its network adapter begin its port insertion by entering a "Phase 0" of the adapter insertion process. During this phase, the network adapter transmits frames to itself to determine if the lobe and the transmit and receive circuitry are functioning properly. Therefore, during this phase, all frames are wrapped back to the adapter by the concentrator so that the adapter will receive exactly what it sends out over the lobe if the link is good.

Once Phase 0 has completed, the network adapter enters "Phase 1" by applying a phantom drive current to the lobe. The concentrator port 16 detects the current's presence and sends a phantom detect interrupt to the concentrator's CPU (not shown), which controls concentrator 14, 44. This phantom detect interrupt identifies the lobe attempting to insert itself into the network. The CPU, unless otherwise directed by the network management system, engages a relay connected in series with the port 16 to connect the station attempting to insert with the network. Alternatively, some concentrators (e.g., the IBM® 8228 MAU) are not intelligent concentrators and may not have a CPU, or even be powered. In this type of concentrator, the phantom drive current charges a capacitor, which then flips a relay in the concentrator to insert the attached adapter.

LAN switches are known in the art of data communication and networking and are used to provide data communication between devices or LAN segments attached to multiple ports of the LAN switch. A "LAN segment" may be defined as a group of nodes where all nodes utilize the same Open System Interconnection (OSI) model physical layer. To connect two devices or LAN segments, the LAN switch enables a node in one LAN segment to communicate with a node in a different LAN segment. Typically, the LAN switch receives data from a node in one LAN segment and passes such data to another LAN segment which contains a destination node. The present invention is embodied in a multi-port LAN switch, such as LAN switch 40, in a preferred embodiment. An example of a currently available LAN switch into which the present invention may be incorporated is the IBM® 8272 Token Ring Switch. While the present invention is described as being incorporated in a LAN switch, it will be appreciated by those skilled in the art that this invention applies to other types of data transfer units, including a "bridge", a "router" or a "gateway".

A LAN switch port performs several functions. Namely, a LAN switch port provides the Media Access Control (MAC) and Physical Layer (PHY) necessary to couple to and communicate with a device attached to the port. Additionally, the LAN switch port maintains current port statistics, including the number of good and bad frames passing through the port and the operational status of the port. "Bad" frames are those frames that contain errors. The port also maintains address tables that list the address of nodes connected to other ports of the multi-port LAN switch. Along with maintaining such address tables, the port also includes circuitry for determining and selecting a destination port. The port also includes buffers for buffering input and/or output frames. Buffering may be needed when a destination port is "busy" or when frames arrive at an aggregate rate that exceeds the capacity of the target port. Finally, a LAN switch port provides interface logic to the "switch fabric". The switch fabric refers to the circuitry that carries data from one port to another. Such switch fabric may be a high-speed bus or a cross-bar switch.

Network adapter 42 is connected to port a of LAN switch 40 and network adapter 43 is connected to port b of LAN switch 40. MAU 44 is connected to port c of LAN switch 40 via lobe 32. Also, the two LAN switches 40 and 46 are connected from port d of LAN switch 40 to port e of LAN switch 46. LAN switch 40 is also connected from its port e to port e of LAN switch 47. Each of the above connections of multi-port LAN switch 40 to the concentrator, network adapters, and switches is made by a standard cable having the standard two twisted pair cabling, as is required to conform with IEEE 802.5.

LAN switches 40, 46 and 47 operate as high speed communication bridges as is known in the art of data communications and networking. A LAN switch can interconnect any two devices attached to its ports, thereby providing a communications link between the devices. The LAN switch can interconnect an attached adapter with another attached adapter, an attached adapter with an attached concentrator, or an attached adapter with an attached LAN switch. The LAN switch also provides an interconnecting link between two attached concentrators or two attached LAN switches. The LAN switch enables connection of local loops, channels, or rings by matching circuits and facilitating accurate data transmission.

According to the present invention, each port of the LAN switch is configured into the proper operational mode, either a port mode or an adapter mode. In the "port mode", the LAN switch is configured to properly transmit and receive data and sink phantom drive current. In the "adapter mode", the LAN switch port is configured to properly transmit and receive data and source a phantom drive current. For example, as shown in FIG. 1, ports a, b of LAN switch 40 would be configured in the port mode to receive and transmit data from network adapters 42 and 43, respectively. Port e of LAN switch 40 would be configured in the adapter mode to enable LAN switch 40 to transmit and receive data to MAU 44.

For example, when inserting onto the token-ring network, it must appear to network adapter 42 as if it were connected to a port of a MAU. Thus, ports a,b of LAN switch 40 must be configured to appear identical to a port of a MAU. Similarly, it must appear to MAU 44 that it is directly connected to an adapter. Consequently, ports c of LAN switch 40 must be configured to emulate to an adapter. According to the present invention, when network adapter 42 attempts to insert into the token-ring and initiates a communication, LAN switch 40 provides a sink for the phantom drive current. Therefore, according to a preferred embodiment of the present invention, in order to allow network adapter 42 to communicate with network adapter 36, one LAN switch port would be placed in adapter mode and the other would be placed in port mode, enabling the transmission of data between port d of LAN switch 40 and port e of LAN switch 46.

Figure 2:
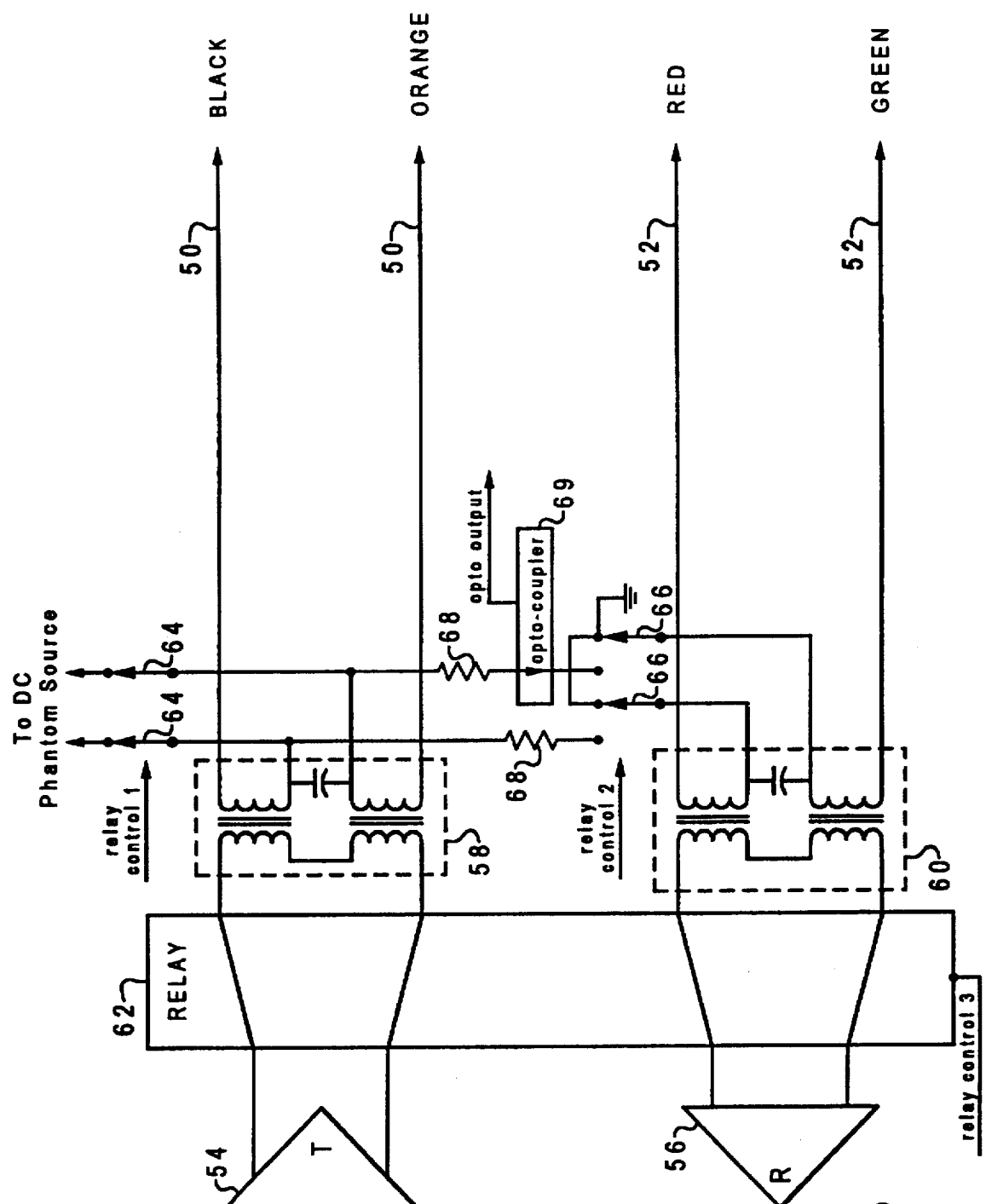
FIG. 2 shows a schematic diagram of a single port of the multi-port LAN switch of the present invention in an adapter mode, in accordance with the preferred embodiment thereof.

Referring now to FIG. 2, there is shown a schematic diagram of a single port of the multi-port LAN switch of the present invention. As shown in FIG. 2, the port is configured in an adapter mode, in accordance with a preferred embodiment of the present invention. When an IEEE 802.5 standard cable connects a device to the port, a first port connection 50 is connected to the black/orange twisted-pair, and a second port connection 52 is connected to the red/green twisted-pair. The first port connection 50 is connected to a first winding of transformer 58, and the second port connection 52 is connected to a first winding of a second transformer 60. A second winding of first transformer 58 and a second winding of second transformer 60 are connected to relay 62. Both transmitter circuit 54 and receiver circuit 56 are also connected to relay 62.

The port includes transmission circuitry 54 and receive circuitry 56, which perform the transmitter and receiver functions, respectfully, required to support connectivity and communication with each possible attached device, including network adapters, MAUs, and other LAN switches. Relay 62 creates electrical connection between circuits 54 and 56, and transformers 58 and 60, as a function of "relay control 3". "Relay control 3" sets relay 62 to the connections shown in FIG. 2 when the port is in adapter mode. When "relay control 3" indicates adapter mode, relay 62 connects transmitter circuit 54 to first transformer 58, and connects receiver circuit 56 to second transformer 60. When "relay control 3" indicates port mode, relay 62 electrically connects transmitter circuit 54 to second transformer 60, and connects receiver circuit 56 to first transformer 58, as shown in FIG. 3.

Referring back to FIG. 2, a DC phantom source (not shown) is connected to switches 64, which are controlled by "relay control 1". Switches 64 connect the two poles of the DC phantom source to the first winding of first transformer 58 to enable phantom drive current to be sourced from the port, out the first port connection, to the attached device on the black/orange twisted-pair. Additionally, when a port is configured in adapter mode, it must provide a return-path for the phantom drive current over the second port connection 52. Switches 66 are controlled by "relay control 2", and are switched to connect the first winding of second transformer 60 to ground, when the port is in adapter mode.

In an alternative preferred embodiment of the present invention, an opto-coupler 69 is connected in series with the return-path. The output of opto-coupler 69 provides an indication of whether the port is in the adapter mode or port mode (by the presence or absence of phantom drive). When configured in the port mode, the opto-coupler 69 will indicate that current is flowing through the return-path.

Figure 3:
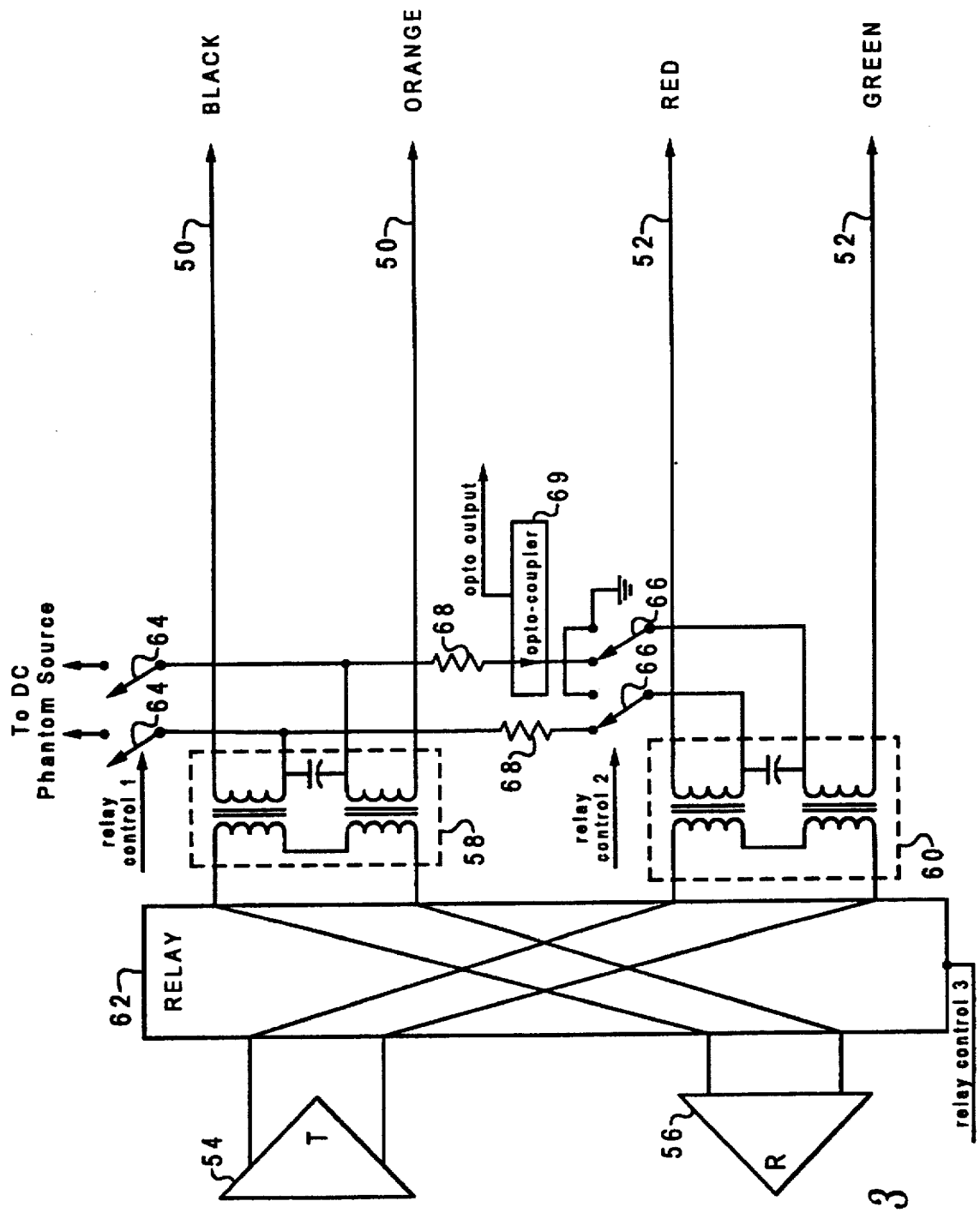
FIG. 3 depicts a single port of the multi-port LAN switch of the present invention configured in a port mode, in accordance with the preferred embodiment of the present invention.

Referring now to FIG. 3, there is depicted a port of a multi-port LAN switch of the present invention configured in a port mode, in accordance with the preferred embodiment of the present invention. As previously described, relay 62 is set in a cross-over configuration by "relay control 3" in the port mode to connect transmitter circuit 54 with second transformer 60 and to connect receiver circuit 56 to first transformer 58. "Relay control 1" has opened switches 64 to disconnect the DC phantom source from the first port connection 50, so that phantom drive current is not sourced while the port is in port mode. Also, switches 66 have been switched by "relay control 2" to connect the first windings of transformers 58 and 60 (through resisters 68), and to provide a return-path (i.e. ground) for phantom drive current sourced by the attached device on the black/orange twisted-pair wires.

As can be seen from the above description, the LAN switch of the present invention is capable of emulating either a network adapter or a concentrator port at each of its own ports. When emulating a network adapter, the LAN switch port will source phantom drive current and transmit data over the black/orange twisted-pair wires and will receive data and provide a ground for the phantom drive current on the red/green twisted-pair. When emulating a concentrator port, the LAN switch port will receive data over the black/orange twisted-pair wires and transmit data over the red/green twisted-pair wires. In addition, while in this port mode, the LAN switch port provides a DC electrical connection between the first and second port connections to provide a return-path over the red/green twisted-pair wires for the phantom current source.

Figure 4:
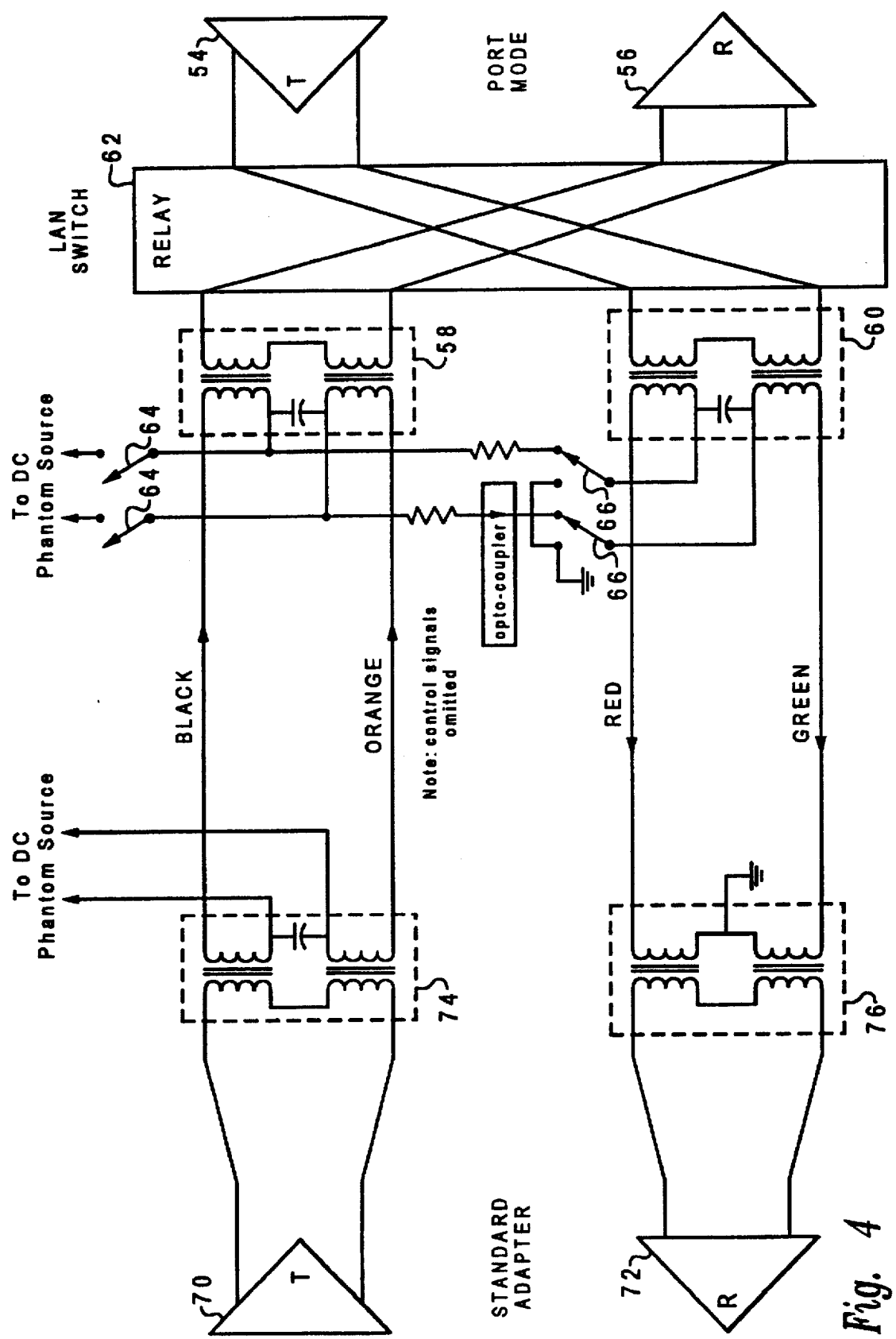
FIG. 4 shows a standard adapter connected to a port of the LAN switch of the present invention configured in a port mode in accordance with the preferred embodiment of the present invention.
Figure 5:
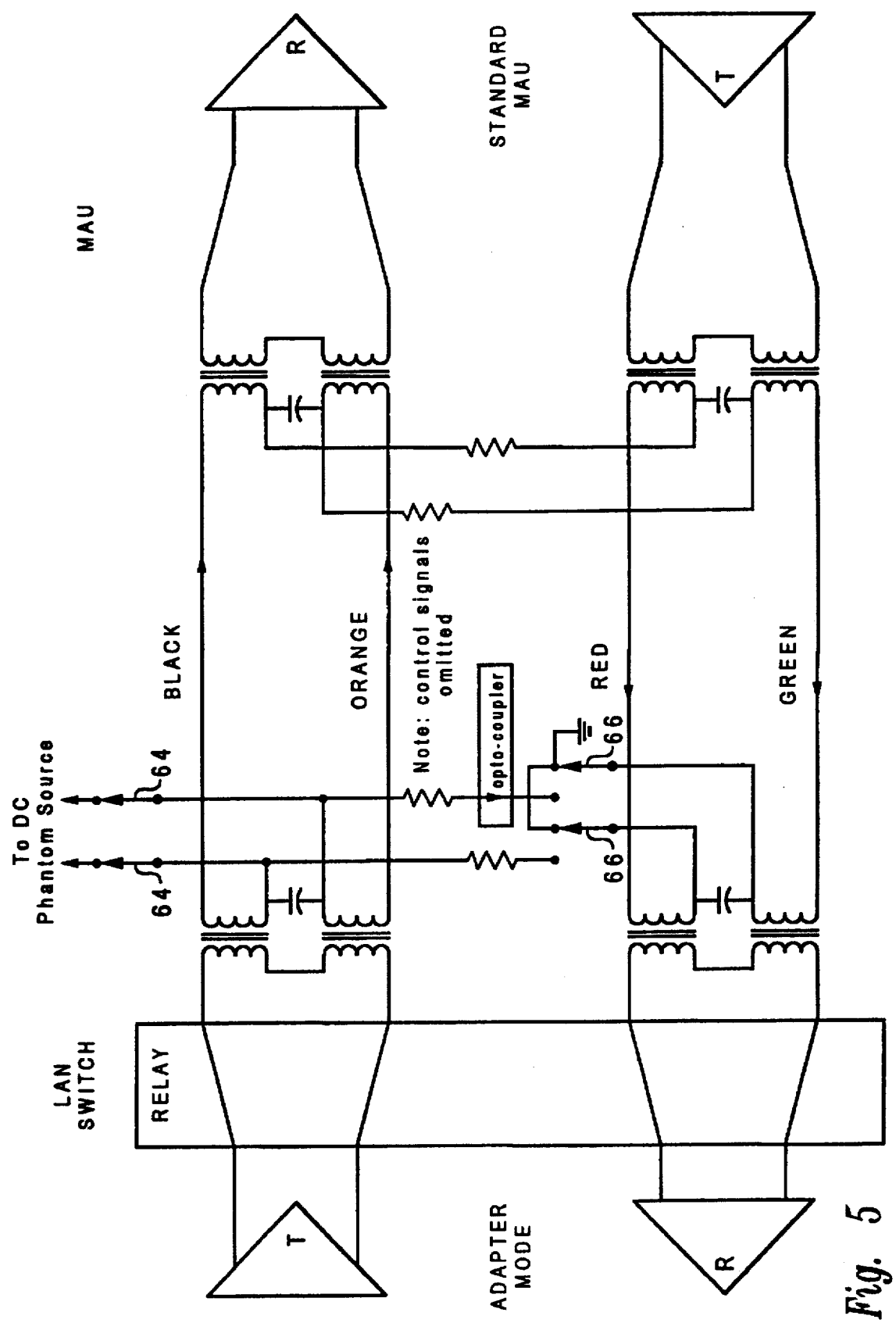
FIG. 5 depicts a port of the multi-port LAN switch of the present invention configured in adapter mode for connection with the standard MAU, in accordance with the preferred embodiment of the present invention.
Figure 6:
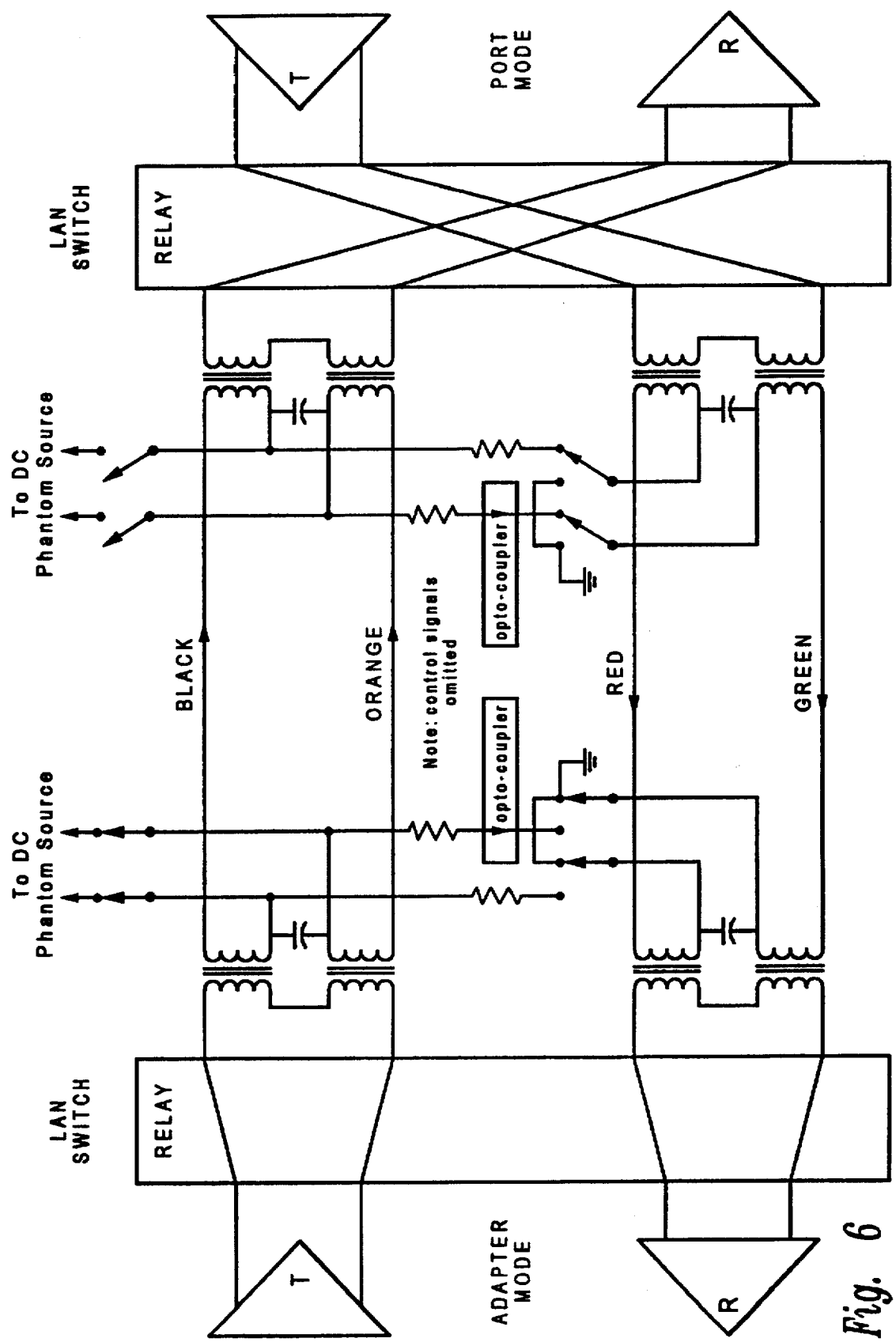
FIG. 6 depicts a schematic block diagram showing a port of a first LAN switch in the adapter mode and a port of a second LAN switch in the port mode, in accordance with the preferred embodiment of the present invention.

Referring now to FIGS. 4–6, there is depicted three schematic block diagrams, each showing a port of the LAN switch of the present invention in either the adapter mode or port mode, as is appropriate for the attached device. FIG. 4 shows a standard adapter connected to a port of the multi-port LAN switch of the present invention configured in port mode, in accordance with the preferred embodiment of the present invention. The standard adapter includes transmitter circuit 70 and receiver circuit 72, and transformer 74 and 76. Since the LAN switch port must be in port mode to communicate with a standard adapter, relay 62 is properly "crossed-over" to connect transmitter circuit 70 to receiver circuit 56, and to connect transmitter circuit 54 with receiver circuit 72. Also, switches 66 are switched to connect the first windings of the port transformers 58 and 60 to provide a DC return-path for the phantom drivecurrent.

FIG. 5 depicts the LAN switch port of the present invention configured in adapter mode for connection with a standard MAU, in accordance with a preferred embodiment of the present invention. In adapter mode, switches 64 are closed to provide a phantom drive current to the standard MAU over the black/orange twisted-pair wires. The MAU returns the phantom drive current over the red/green twisted-pair wires to ground through switches 66.

FIG. 6 depicts a schematic block diagram showing a port of a first LAN switch of the present invention in the adapter mode, and a port of a second LAN switch of the present invention in the port mode, in accordance with a preferred embodiment of the present invention. Here, the two LAN switches of the present invention are connected using a standard cable, rather than a "crossed" cable, as would be required by prior art LAN switches.

As is known by those skilled in the art, a LAN switch is an intelligent device having data processing capabilities, including determining the destination node of a frame of data, based on addressing information received with the data, and transferring the received data to the port connecting with the destination node. As is described hereinbelow, the LAN switch of the present invention automatically determines what type of device is attached to each of its ports, and then configures those ports in either the port mode or the adapter mode to allow proper communication between each of the attached devices. The advantages of this capability are: 1) All cabling can be of same polarity (i.e., no crossed cables are needed), and 2) no manual intervention is required (e.g., installation of special cables or setting of port configuration switches). The overall advantage is lower-cost and higher-reliability installation and maintenance.

Thus, an additional feature of the LAN switch port of the present invention is its capability of automatically determining the type of device connected to the port, and configuring the port to the proper operational mode required to enable communication with the device. For example, a LAN switch-to-LAN switch connection requires opposite transmit and receive polarities between the two switch ports (i.e., one being port mode and one being adapter mode). The method described hereinbelow senses the attached LAN switch and properly configures the port to allow communication with the attached LAN switch.

The port also has the capability of determining whether an attached adapter or LAN switch is a half-duplex or a full-duplex device. For example, as seen in FIG. 1, adapter 42 is a half-duplex (HDX) adapter and adapter 43 is a full-duplex (FDX) adapter. Also, LAN switch 47 is a FDX switch, and LAN switch 46 is a HDX switch. In token-ring nomenclature, half-duplex (HDX) refers to the normal token passing access protocol as defined by IEEE 802.5. Full-duplex (FDX) refers to the transmit immediate access protocol currently being defined by IEEE 802.5. FDX operation is based on a point-to-point connection of two devices and does not use tokens. In the FDX mode, each device can transmit and receive at any time (i.e., without waiting for a token). A method of FDX operation for a token-ring network is described in "Token-Ring 16/4 Adapter with Full Duplex Switching Mode.", Strole, N., Christensen, K., Noel, F., and Zeisz, R., IBM Technical Disclosure Bulletin, Vol. 37, No. 04A, pp. 617–618, April 1994.

Each LAN switch port contains a Token Ring Controller (not shown), including full Media Access Control (MAC) and Physical (PHY) layer implementations. In addition, each Token Ring Controller includes a central processing unit (CPU), called the port CPU (not shown). The port CPU controls the determination of connection type and then performs the insertion of the attached device by configuring the LAN switch port into the proper operational mode. The LAN switch port is configured by asserting one or more mode signals, in particular, the relay control signals 1–3, as was described hereinabove for configuring into either the adapter mode or port mode. This process is described in detail in conjunction with FIGS. 7–8 below. Thus, there are two possible configurations for a port in adapter mode (FDX adapter or HDX adapter) and two possible configurations for a port in port mode (FDX port or HDX port).

Figure 7:
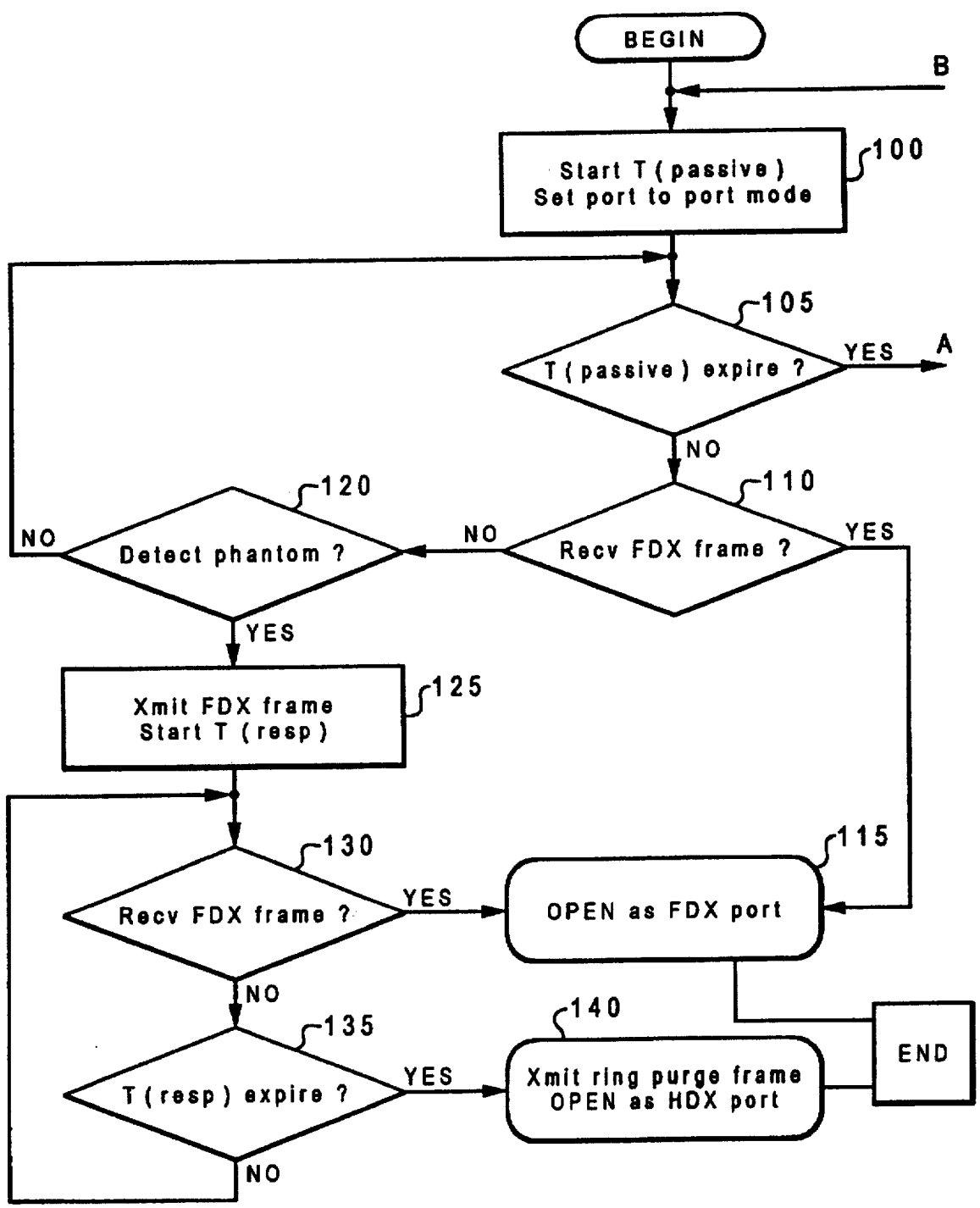
FIG. 7 depicts a flow diagram of the preferred method of automatically determining an attached device type and configuring the multi-port LAN switch of the present invention.
Figure 8:
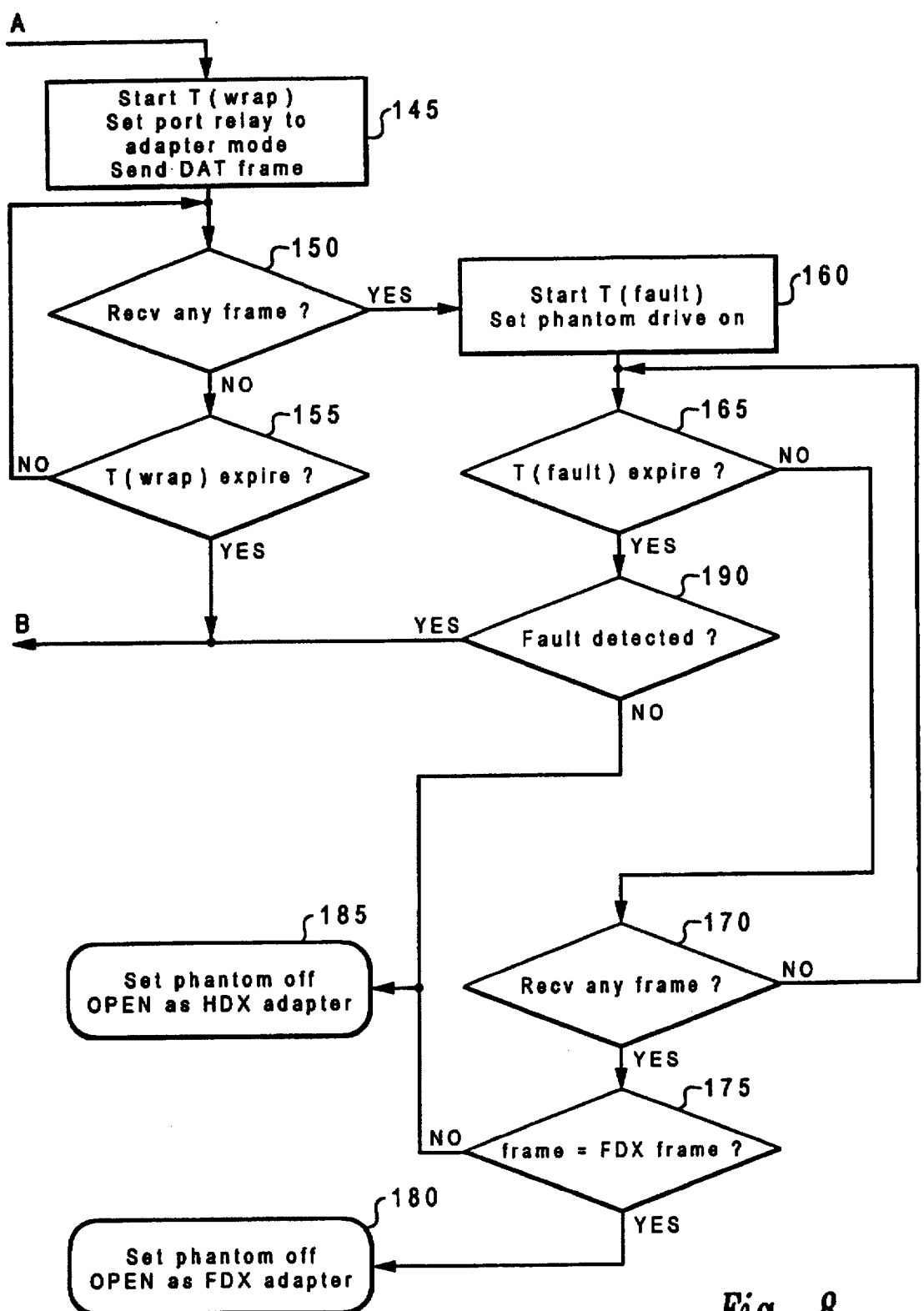
FIG. 8 depicts a flow diagram continuing the flow diagram of FIG. 7 showing the preferred method of automatically determining the connection type of an attached device and configuring the multi-port LAN switch of the present invention, in accordance with a preferred embodiment of the present invention.

Referring now to FIGS. 7–8, there is depicted a flow diagram of the method of automatically determining an attached device type and for configuring a LAN switch port for the multi-port LAN switch of the present invention, in accordance with a preferred embodiment of the present invention. Referring first to FIG. 7, the process begins at step 100 where the port CPU starts the timer T(passive). This timer times a passive detect mode. The total time of T(passive) is determined via a random number generator and is in the range from 3 seconds to 3.2 seconds. Using a random number generator insures that two connected LAN switch ports cannot both always be in the passive detect mode at the same time, and, consequently, one will attempt to insert in the other. Also, at step 100, the switch port is set in the port mode.

At step 105, a determination whether T(passive) has expired is made. If T(passive) has expired, the process proceeds to step 145 (see FIG. 8), as indicated by A. If T(passive) has not expired, the process proceeds to decision block 110, where it is determined whether a FDX frame has been received. If so, the LAN switch port is opened (i.e., configured) as a FDX port, as shown at step 115. If a FDX frame has not been received at step 110, the LAN switch port determines whether a phantom drive current has been asserted by an attached device, as shown at step 120. If the phantom drive current is not detected at step 120, the process returns to step 105. The phantom drive current can be detected by a sensor such as the opto-coupler 69 shown in FIG. 2. If either of the decisions at steps 110 or 120 are affirmative, the attached device is attempting to insert into the port.

If phantom drive current is detected at step 120, the port has determined that an adapter or a LAN switch port in adapter mode is attached to the port. The process proceeds to step 125, where the port transmits a FDX frame from transmit circuitry 54 over the red/green twisted-pair to the attached device's receiver circuitry. Also, at step 125, a timer T(resp) is started. The timer T(resp) provides a period in which the LAN switch port waits for a response transmission of a FDX registration frame. The value of T(resp) is 800 milliseconds in a preferred embodiment of the present invention.

The process then proceeds to step 130 where the port listens for an FDX frame to be transmitted by the attached adapter or switch. If a FDX frame is received, the LAN switch port is opened (i.e., configured) as a FDX port, as shown at step 115. If a FDX frame has not been received at step 130, and the timer T(resp) has not expired, as determined at step 135, the process loops back to step 130 where the port continues to listen for an FDX frame to be transmitted by the attached adapter. If the timer T(resp) has expired, the process proceeds to step 140 where the LAN switch port is opened (i.e., configured) as a HDX port. Also at step 140, the port transmits a ring purge frame. The purge frame is a standard IEEE 802.5 defined MAC frame used to clear a ring segment of frames or tokens.

Referring now to FIG. 8, there is depicted a flow diagram, continuing the flow diagram of FIG. 7, showing the method of automatically determining the connection type of an attached device and configuring the LAN switch port according to a preferred embodiment of the present invention. When the process proceeds to step 145 (as indicated by A) as a result of the timer T(passive) expiring (determined at step 105), a wrap timer T(wrap) is started. The value of T(wrap) is 30 milliseconds in a preferred embodiment. Also, at step 145, the relay 62 in the LAN switch port is set to the uncrossed position, or adapter mode, and a Duplicate Address Test (DAT) MAC frame, as defined in the IEEE 802.5 standard, is transmitted by the port.

The port then listens for any type of frame to be received by its receiver circuitry, at step 150. If no frame has been received, the port continues to loop back to step 150 until the timer T(wrap) has expired at step 155, and the process returns to step 100 (as indicated by B). If a frame has been received by the port prior to the timer T(wrap) expiring, the process proceeds to step 160, where a fault timer T(fault) is started (the value of T(fault) is 10 to 15 seconds in a preferred embodiment) and a phantom drive current is sourced by the port [closing switches 64], thereby asserting a phantom drive current on the black/orange twisted-pair. If the timer T(fault) has not expired, as determined at step 165, the port determines whether any type of frame has been received, at step 170. If no frame has been received, the process returns to step 165. If a frame is received, the port determines whether the frame is a FDX frame, at step 175. If the frame is a FDX frame, the port sets the phantom drive current off, and opens (i.e., configures) in the FDX adapter mode, as indicated at step 180. If it is determined that the frame is not a FDX frame at step 175, then the attached port must be an HDX port. In that case, the LAN switch port sets the phantom drive current off and opens (i.e., configures) as a HDX adapter, as indicated at step 185.

If the fault timer T(fault) expires, as determined at step 165, prior to the port receiving any frame, the process proceeds to step 190, where it is determined whether a wiring fault condition has been detected. If a wiring fault condition is present (for example, when a cable is not connected to the port), the phantom drive current will not have a return-path and a fault will be detected. When a fault is detected at step 190, the process returns to step 100 (as indicated by B). If no fault is detected at step 190, the process proceeds to step 185, where the phantom drive current is turned off and the port is opened (i.e., configured) as a HDX adapter.

In summary, the LAN switch of the present invention is capable of emulating either a network adapter or a concentrator port at each of its own ports. When emulating a network adapter, the LAN switch port will source phantom drive current and transmit data over the black/orange twisted-pair wires and will receive data and provide a ground for the phantom drive current on the red/green twisted-pair. When emulating a concentrator port, the LAN switch port will receive data over the black/orange twisted-pair wires and transmit data over the red/green twisted-pair wires. In addition, while in this port mode, the LAN switch port provides a DC electrical connection between the first and second port connections to provide a return-path over the red/green twisted-pair wires for the phantom current source.

While the invention has been particularly shown and described with reference to a preferred embodiment, it will be understood by those skilled in the art that various changes in form and detail may be made therein without departing from the spirit and scope of the invention.

What is claimed is:

1. A data transfer unit for a network, each port of the data transfer unit having a first port connection, a second port connection, a transmitter circuit and a receiver circuit, each port of the data transfer unit comprising:

a first transformer having a first winding connected to the first port connection, and a second winding;

a second transformer having a first winding connected to the second port connection, and a second winding;

a switching system that switches the port to a first mode or a second mode as a function of a mode signal for that port, wherein the switching system in the first mode connects the second winding of the first transformer to the transmitter circuit and the second winding of the second transformer to the receiver circuit, and wherein the switching system in the second mode connects the second winding of the first transformer to the receiver circuit and the second winding of the second transformer to the transmitter circuit.

2. A data transfer unit for a network according to claim 1, each port further comprising:

a first switch;

a DC voltage source switchably connected to the first port connection through the first switch; and a second switch having a first and second position, and connecting the second port connection to a DC return-path in the first position and to the first port connection in the second position.

3. A data transfer unit for a network according to claim 1, wherein every transmitter circuit is interconnected with every receiver circuit such that each port can communicate with every other port.

4. A data transfer unit for a network according to claim 1, wherein a port is connected to a data transfer unit.

5. A data transfer unit for a network according to claim 1, wherein a port is connected to a standard adapter.

6. A data transfer unit for a network according to claim 1, wherein a port is connected to a concentrator.

7. A data transfer unit for a network unit according to claim 1, wherein the data transfer unit is a multi-port LAN switch.

8. A data transfer unit for a network, each port of the data transfer unit having a second port connection, a first port connection, a transmitter circuit and a receiver circuit, each port of the data transfer unit comprising:

a switching system that switches the port to a first mode or a second mode as a function of a mode signal for that port, wherein the switching system switched to the first mode connects the first port connection to the transmitter circuit and the second port connection to the receiver circuit, and wherein the switching system switched to the second mode connects the first port connection to the receiver circuit and the second port connection to the transmitter circuit;

a first switch;

a DC voltage source switchably connected to the first port connection through the first switch; and a second switch having a first and second position, and connecting the second port connection to a DC return-path in the first position and to the first port connection in the second position.

9. A data transfer unit for a network according to claim 8, wherein every transmitter circuit is interconnected with every receiver circuit such that each port can communicate with every other port.

10. A data transfer unit for a network according to claim 8, wherein a port is connected to a data transfer unit.

11. A data transfer unit for a network according to claim 8, wherein a port is connected to a standard adapter.

12. A data transfer unit for a network according to claim 8, wherein a port is connected to a concentrator.

13. A data transfer unit for a network according to claim 8, wherein the data transfer unit is a multi-port LAN switch.

14. A data communications networking system comprising:

a plurality of network adapters;

a concentrator connecting one or more of the plurality of network adapters to form a token-ring network; and a first data transfer unit having one of the plurality of network adapters connected to a first port of the data transfer unit and the concentrator connected to a second port of the data transfer unit, each port of the first data transfer unit having a first port connection, a second port connection, a transmitter circuit and a receiver circuit, and further each port of the data transfer unit including:

a switching system that switches the port to a first mode or a second mode as a function of a mode signal for that port, wherein the switching system switched to the first mode connects the first port connection to the transmitter circuit and the second port connection to the receiver circuit, and wherein the switching system switched to the second mode connects the first port connection to the receiver circuit and the second port connection to the transmitter circuit;

a first switch;

a DC voltage source switchably connected to the first port connection through the first switch; and a second switch having a first and second position, and connecting the second port connection to a DC return-path in the first position and to the first port connection in the second position.

15. A data communications networking system according to claim 14, wherein every transmitter circuit is interconnected with every receiver circuit such that each port can communicate with every other port.

16. A data communications networking systems according to claim 14, wherein a third port of the data transfer unit is connected to a first port of a second data transfer unit.

17. A data communications networking system according to claim 14, wherein a first mode signal switches the switching system of the first port of the first data transfer unit to the second mode.

18. A data communications networking system according to claim 14, wherein a second mode signal switches the switching system of the second port of the first data transfer unit to the first mode.

19. A data communications networking system according to claim 14, wherein the first data transfer unit is a LAN switch.

\* \* \* \* \*